(12) United States Patent
Tsividis

(10) Patent No.: US 11,638,210 B1
(45) Date of Patent: Apr. 25, 2023

(54) POWER DISSIPATION REDUCTION IN WIRELESS TRANSCEIVERS

(71) Applicant: THETA IP, LLC, Coppell, TX (US)

(72) Inventor: Yannis Tsividis, New York, NY (US)

(73) Assignee: Theta IP, LLC, Coppell, TX (US)

( * ) Notice: Subject to any disclaimer, the term of this patent is extended or adjusted under 35 U.S.C. 154(b) by 0 days.

(21) Appl. No.: 18/086,603

(22) Filed: Dec. 21, 2022

Related U.S. Application Data

(63) Continuation of application No. 17/407,897, filed on Aug. 20, 2021, now Pat. No. 11,564,164, which is a
(Continued)

(51) Int. Cl.
  *H04W 52/02* (2009.01)
  *H04B 1/38* (2015.01)
  *H04B 1/10* (2006.01)

(52) U.S. Cl.
  CPC ........ *H04W 52/0209* (2013.01); *H04B 1/109* (2013.01); *Y02D 30/70* (2020.08)

(58) Field of Classification Search
  CPC ............. H04W 52/02; H04W 52/0209; H04W 52/0225; H04W 52/0229; H04W 52/0238; H04W 52/0245; H04W 52/0261; H04W 52/0274; H04W 52/082; H04W 52/52; H04W 52/241; H04W 52/243; H04W 52/245; H04W 72/082; H04W 72/085; H04B 1/04; H04B 1/10; H04B 1/16; H04B 1/109; H04B 1/1036; H04B 1/7097; H04B 1/715; H04B 10/40; H04B 10/60; H04B 17/309; H04B 17/318; H04B 17/336; H04B 17/345; H03F 1/56; H03F 2200/27;
(Continued)

(56) References Cited

U.S. PATENT DOCUMENTS

| | | | |
|---|---|---|---|
| 3,408,587 A | 10/1968 | Lancaster | |
| 4,270,222 A | 5/1981 | Menant | |

(Continued)

FOREIGN PATENT DOCUMENTS

| | | |
|---|---|---|
| DE | 10026152 C2 | 2/2001 |
| EP | 0795967 A1 | 9/1997 |

(Continued)

OTHER PUBLICATIONS

US 6,529,069 B2, 03/2003, Krishnapura (withdrawn)
(Continued)

*Primary Examiner* — Quochien B Vuong
(74) *Attorney, Agent, or Firm* — Jennifer Hayes; Nixon Peabody LLP

(57) ABSTRACT

Methods and circuits for reducing power dissipation in wireless transceivers and other electronic circuits and systems. Embodiments of the present invention use bias current reduction, impedance scaling, and gain changes either separately or in combination to reduce power dissipation. For example, bias currents are reduced in response to a need for reduced signal handling capability, impedances are scaled thus reducing required drive and other bias currents in response to a strong received signal, or gain is increased and impedances are scaled in response to a low received signal in the presence of no or weak interfering signals.

11 Claims, 15 Drawing Sheets

Related U.S. Application Data continuation of application No. 16/714,629, filed on Dec. 13, 2019, now Pat. No. 11,129,097, which is a continuation of application No. 15/824,841, filed on Nov. 28, 2017, now Pat. No. 10,524,202, which is a continuation of application No. 15/080,421, filed on Mar. 24, 2016, now Pat. No. 9,838,962, which is a continuation of application No. 11/318,646, filed on Dec. 27, 2005, now Pat. No. 9,331,728, which is a continuation of application No. 10/784,613, filed on Feb. 23, 2004, now Pat. No. 7,010,330.

(60) Provisional application No. 60/451,230, filed on Mar. 1, 2003, provisional application No. 60/451,229, filed on Mar. 1, 2003.

(58) Field of Classification Search
CPC ........... H03F 2200/78; H03F 2200/378; H03F 2200/451; H03F 2200/294
See application file for complete search history.

(56) References Cited

U.S. PATENT DOCUMENTS

| | | |
|---|---|---|
| 4,355,414 A | 10/1982 | Inoue |
| 4,894,566 A | 1/1990 | Rush |
| 5,001,776 A | 3/1991 | Clark |
| 5,020,147 A | 5/1991 | Okanobu |
| 5,179,724 A | 1/1993 | Lindoff |
| 5,390,357 A | 2/1995 | Nobusawa |
| 5,392,457 A | 2/1995 | Davis |
| 5,406,613 A | 4/1995 | Peponides |
| 5,406,635 A | 4/1995 | Jarvinen |
| 5,408,697 A | 4/1995 | Price |
| 5,412,498 A | 5/1995 | Arstein |
| 5,564,094 A | 10/1996 | Anderson |
| 5,600,271 A | 2/1997 | Erickson |
| 5,638,141 A | 6/1997 | Bae |
| 5,661,437 A | 8/1997 | Nishikawa |
| 5,751,148 A | 5/1998 | Kennedy |
| 5,809,400 A | 9/1998 | Abramsky |
| 5,854,973 A | 12/1998 | Holtvoeth |
| 5,864,760 A | 1/1999 | Gilhousen |
| 5,867,063 A | 2/1999 | Snider |
| 5,886,547 A | 3/1999 | Durec |
| 5,907,798 A | 5/1999 | Abramsky |
| 5,930,692 A | 7/1999 | Peterzell |
| 5,949,286 A | 9/1999 | Jones |
| 5,995,853 A | 11/1999 | Park |
| 6,026,288 A | 2/2000 | Bronner |
| 6,081,558 A | 6/2000 | North |
| 6,100,761 A | 8/2000 | Ezell |
| 6,134,430 A | 10/2000 | Younis |
| 6,157,668 A | 12/2000 | Gilhousen |
| 6,175,279 B1 | 1/2001 | Ciccarelli |
| 6,259,901 B1 | 7/2001 | Shinomiya |
| 6,259,928 B1 | 7/2001 | Vembu |
| 6,298,221 B1 | 10/2001 | Nguyen |
| 6,311,048 B1 | 10/2001 | Loke |
| 6,339,711 B1 | 1/2002 | Otaka |
| 6,351,172 B1 | 2/2002 | Ouyang |
| 6,360,085 B1 | 3/2002 | Walley |
| 6,370,187 B1 | 4/2002 | Agah |
| 6,370,210 B1 | 4/2002 | Yamamoto |
| 6,388,525 B1 | 5/2002 | Bien |
| 6,389,445 B1 | 5/2002 | Tsividis |
| 6,400,177 B1 | 6/2002 | Yoshizaki |
| 6,498,926 B1 | 12/2002 | Ciccarelli |
| 6,509,796 B2 | 1/2003 | Nguyen |
| 6,546,058 B1 | 4/2003 | Gilhousen |
| 6,577,677 B1 | 6/2003 | Hara |
| 6,621,339 B2 | 9/2003 | Tripathi |
| 6,633,550 B1 | 10/2003 | Gardenfors |
| 6,639,447 B2 | 10/2003 | Manku |
| 6,657,498 B2 | 12/2003 | Park |
| 6,668,028 B1 | 12/2003 | Wieck |
| 6,670,901 B2 | 12/2003 | Brueske |
| 6,683,492 B2 | 1/2004 | Krishnapura |
| 6,687,491 B2 | 2/2004 | Wieck |
| 6,690,922 B1 | 2/2004 | Lindermann |
| 6,694,129 B2 | 2/2004 | Peterzell |
| 6,697,611 B1 | 2/2004 | Franca-Neto |
| 6,710,651 B2 | 3/2004 | Forrester |
| 6,714,557 B1 | 3/2004 | Smith |
| 6,724,251 B1 | 4/2004 | Ziazadeh |
| 6,735,424 B1 | 5/2004 | Larson |
| 6,784,738 B1 | 8/2004 | Jin |
| 6,801,760 B2 | 10/2004 | Hutchinson |
| 6,807,406 B1 | 10/2004 | Razavi |
| 6,819,938 B2 | 11/2004 | Sahota |
| 6,819,939 B2 | 11/2004 | Masamura |
| 6,826,418 B2 | 11/2004 | Adachi |
| 6,870,425 B2 | 3/2005 | Leifso |
| 6,933,779 B2 | 8/2005 | Lee |
| 6,944,427 B2 | 9/2005 | Haub |
| 6,963,755 B2 | 11/2005 | Chen |
| 6,965,655 B1 | 11/2005 | Mostov |
| 6,993,297 B2 | 1/2006 | Smith |
| 7,016,654 B1 | 3/2006 | Bugeja |
| 7,054,605 B1 | 5/2006 | Groe |
| 7,076,231 B2 | 7/2006 | Yamawaki |
| 7,079,825 B2 | 7/2006 | Wieck |
| 7,095,994 B1 | 8/2006 | Aytur |
| 7,130,602 B2 | 10/2006 | Ciccarelli |
| 7,149,246 B1 | 12/2006 | Adams |
| 7,190,935 B2 | 3/2007 | Hecht |
| 7,248,653 B2 | 7/2007 | Wieck |
| 7,274,760 B2 | 9/2007 | Palaskas |
| 7,283,851 B2 | 10/2007 | Persico |
| 7,299,021 B2 | 11/2007 | Parssinen |
| 7,395,087 B2 | 7/2008 | Watanabe |
| 7,592,873 B2 | 9/2009 | Satoh |
| 7,643,439 B2 | 1/2010 | Kochman |
| 7,656,933 B2 | 2/2010 | Klinke |
| RE41,582 E | 8/2010 | Larson |
| 7,778,351 B2 | 8/2010 | Hsu |
| 8,538,365 B2* | 9/2013 | Croman ............ H04W 52/0245 455/296 |
| 8,699,984 B2* | 4/2014 | Mendoza ................ H04B 1/109 455/150.1 |
| 9,344,202 B2 | 5/2016 | Eddowes |
| 9,350,313 B2 | 5/2016 | Wilhelmsson |
| 9,838,962 B2 | 12/2017 | Tsividis |
| 9,935,798 B2* | 4/2018 | De Foucauld ........ H04W 52/52 |
| 10,524,202 B2 | 12/2019 | Tsividis |
| 11,129,097 B2 | 9/2021 | Tsividis |
| 11,564,164 B2 | 1/2023 | Tsividis |
| 2002/0036519 A1 | 3/2002 | Krishnapura |
| 2002/0050861 A1 | 5/2002 | Nguyen |
| 2002/0137478 A1 | 9/2002 | Masamura |
| 2002/0190796 A1 | 12/2002 | Park |
| 2003/0002452 A1 | 1/2003 | Sahota |
| 2003/0025623 A1 | 2/2003 | Brueske |
| 2003/0076168 A1 | 4/2003 | Forrester |
| 2003/0086383 A1 | 5/2003 | Bremer |
| 2003/0100279 A1 | 5/2003 | Medvid |
| 2003/0112059 A1 | 6/2003 | Krishnapura |
| 2003/0112060 A1 | 6/2003 | Krishnapura |
| 2003/0117212 A1 | 6/2003 | Krishnapura |
| 2003/0124999 A1 | 7/2003 | Parssinen |
| 2003/0169089 A1 | 9/2003 | Manku |
| 2004/0042572 A1 | 3/2004 | Palaskas |
| 2004/0077324 A1 | 4/2004 | Wieck |
| 2004/0091035 A1 | 5/2004 | Palaskas |
| 2004/0152429 A1 | 8/2004 | Haub |
| 2016/0212700 A1 | 7/2016 | Tsividis |
| 2018/0084492 A1 | 3/2018 | Tsividis |
| 2020/0120600 A1 | 4/2020 | Tsividis |
| 2021/0385748 A1 | 12/2021 | Tsividis |

FOREIGN PATENT DOCUMENTS

| | | |
|---|---|---|
| GB | 2362523 A | 11/2001 |
| JP | 10-106118 A | 4/1998 |

(56) References Cited

FOREIGN PATENT DOCUMENTS

| JP | 11-298348 H | 10/1999 |
|---|---|---|
| WO | WO 2002035756 A3 | 5/2002 |
| WO | WO 2002056470 A1 | 7/2002 |
| WO | WO 2002056558 A3 | 7/2002 |
| WO | WO 2004017589 A1 | 2/2004 |

OTHER PUBLICATIONS

Aparin, Vladimir, et al., "A Highly-Integrated Tri-Band/Quad-Mode SiGe BiCMOS RF-to-Baseband Receiver for Wireless CDMA/WCDMNAMPS Applications with GPS Capability", 2002 IEEE International Solid-State Circuits Conference, Session 14, Cellular RF Wireless, 14.3, (2002).

Behbahani, Farbod, et al., "A Broad-Band Tunable CMOS Channel-Select Filter for a Low-IF Wireless Receiver", IEEE Journal of Solid-State Circuits, vol. 35, No. 4, (Apr. 2000), pp. 476-489.

Behbahani, Farbod, et al., "Adaptive Analog IF Signal Processor for a Wide-Band CMOS Wireless Receiver", IEEE Journal of Solid-State Circuits, vol. 36, No. 8, (Aug. 2001 ), pp. 1205-1217.

Behbahani, Farbod, "An Adaptive Scalable 2.4 GHz Frequency Hopping Receiver for Wideband Wireless LAN", A dissertation submitted in gartial satisfaction of the requirements for the degree of Doctor of Philosoi;2ht in Electrical Engineering, University of California Los Angeles (1999).

Behzad, Arya R., et al., "A 5-GHz Direct Conversion CMOS Transceiver Utilizing Automatic Frequency Control for the IEEE 802.11 a Wireless LAN Standard", IEEE Journal of Solid-State Circuits, vol. 38, No. 12, (Dec. 2003), pp. 2209-2220.

Christensen, Craig L., "A Low Power, Low Datarate Integrated 433MHz Wireless Transceiver in CMOS", Proceedings of the 15th Biennial Universitv/Government/Industrv Microelectronics Svmoosium (2003), pp. 70-73.

Dasgupta, Uday, et al., "A CMOS Transmit/Receive IF Chip-Set for WCDMA Mobiles", 2002 IEEE Radio Freguenct Integrated Circuits Stmi:2osium, MO4A-4, (2002), pp. 195-1 98.

Gray, P.R., et al., "Future Directions in Silicon ICs for RF Personal Communications", IEEE 1995 Custom Integrated Circuits Conference, (1995), pp. 83-90.

Hollman, Tuomas, et al., "A 2.7-V CMOS Dual-Mode Baseband Filter for PDC and WCDMA", IEEE Journal of Solid-State Circuits, vol. 36, No. 7, (Jul. 2001 ), pp. 1148-1153.

Lee, Kang-Yoon, et al., "Full-CMOS 2-GHz WCDMA Direct Conversion Transmitter and Receiver", IEEE Journal of Solid-State Circuits, vol. 38, No. 1, (Jan. 2003), pp. 43-53.

Leung, Vincent, et al., "Digital-IF WCDMA Handset Transmitter IC in 0.25um SiGe BiCMOS", 2004 IEEE International Solid-State Circuits Conference, (2004), pp. 182-183.

Orsatti, Paolo, et al., "A 20-mA-Receive, 55-mA-Transmit, Single-Chip GSM Transceiver in 0.25-µm CMOS", IEEE Journal of Solid-State Circuits, vol. 34, No. 12, (Dec. 1999), pp. 1869-1880.

Parssinen, Aarno , et al., "A 2-GHz Wide-Band Direct Conversion Receiver for WCDMA Applications", IEEE Journal of Solid-State Circuits, vol. 34, No. 12, (Dec. 1999), Pqs. 1893-1903.

Reynolds, S , et al., "A Direct-Conversion Receiver IC for WCDMA Mobile Systems", Proceedings of the 2002 Bigolar/BiCMOS Circuits and Technology Meeting (2002), pp. 61-64.

Rudell, Jacques C., et al., "Recent Developments in High Integration Multi-Standard CMOS Transceivers for Personal Communication Systems", Proceedings of the 1998 International Symgosium on Low Power Electronics and Design 1 (Aug. 10-12, 1998), pp. 149-154.

Ryynanen, Jussi, et al., "RF Gain Control in Direct Conversion Receivers", IEEE, (2002), pp. IV-117-IV-120.

Sanielevici, Sergio A., et al., "A 900-MHz Transceiver Chipset for Two-Way Paging Applications", IEEE Journal of Solid-State Circuits, vol. 33, No. 12, (Dec. 1998), pp. 2160-2168.

Schuchter, Walter, et al., "A Single Chip FSK/ASK 900MHz Transceiver in a Standard 0.25um CMOS Technology", 2001 IEEE Radio Frequency Integrated Circuits (RFIC) Svmoosium ( 2001), pp. 183-186.

Tadjpour, Shahrzad, "A 900 MHz Dual Conversion, Low-IF CMOS GSM Receiver", A dissertation submitted in gartial satisfaction of the reguirements for the degree Doctor of Philosoi;2ht in Electrical Engineering, Universitt of California, Los Angeles (2001).

Tasic, Aleksandar, et al., "Concept of Frequency-Transconductance Tuning of Bipolar Voltaqe-Controlled Oscillators", IEEE, (2002), pp. 111-555-111-558.

Tasic, Aleksandar, et al., "Concept of Phase-Noise Tuning of Bipolar Voltage-Controlled Oscillators", IEEE, (2002), pp. V-161-V-164.

Tsividis, Y. , et al., "Internally Varying Analog Circuits Minimize Power Dissipation", IEEE Circuits & Devices Maaazine (Jan. 2003), pp. 63-72.

Tsividis, Y , "Minimising power dissipation in analogue signal processors through syllabic companding", Electronic Letters, vol. 35, No. 21, (Oct. 14, 1999), pp. 1805-1807.

Van Den Bos, Chris, et al., "Architecture of a reconfigurable radio receiver frontend using overall feedback", Electronics Research Laboratory, Delft University of Technology, (2001).

Xiong, Wei, et al., "An S-band Low-Noise Amplifier with Self-Adjusting Bias for Improved Power Consumption and Dynamic Range in a Mobile Environment", 1999 IEEE Radio Freauencv Intearated Circuits SvmDosium TUE5-4, (1999), pp. 193-196.

Yoshizawa, Atsushi, et al., "An Anti-Blocker Structure MOSFET-C Filter for a Direct Conversion Receiver", IEEE 2001 Custom Integrated Circuits Conference, (2001 ), pp. 5-8.

Zargari, Masoud, et al., "A Single-Chip Dual-Band Tri-Mode CMOS Transceiver for IEEE 802.11 a/b/g WLAN", 2004 IEEE International Solid-State Circuits Conference, (2004), pp. 96-97.

* cited by examiner

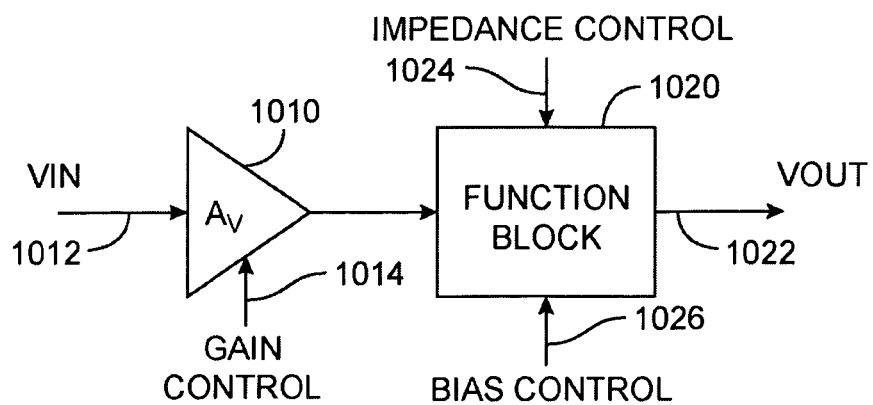
FIG. 10A
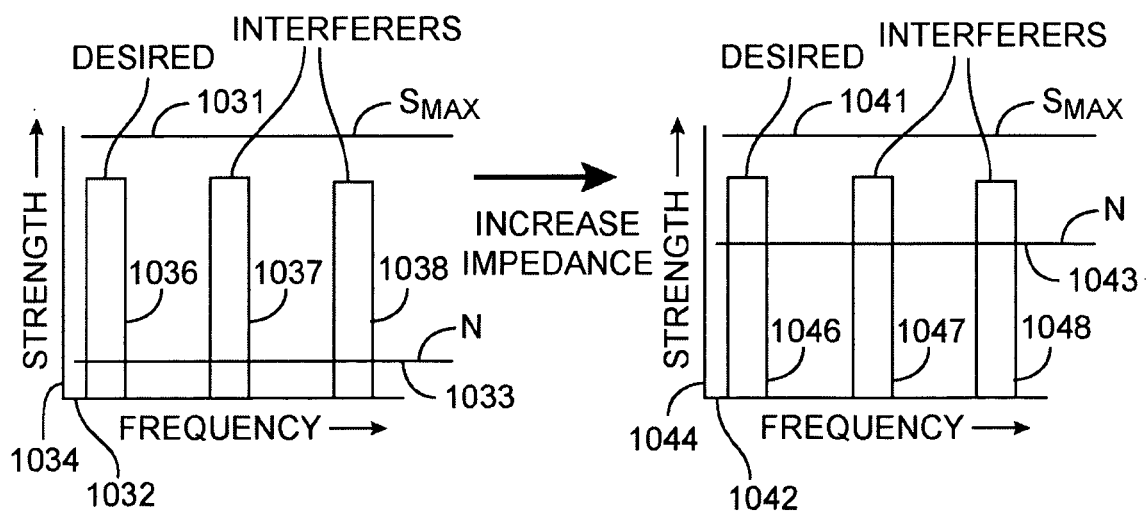
FIG. 10B
FIG. 10C

| RECEIVED SIGNAL 1210 | | RESPONSE TO RECEIVED SIGNAL 1220 | | |
|---|---|---|---|---|
| SIGNAL STRENGTH | INTERFERER STRENGTH | DECREASE SMAX | INCREASE IMPEDANCE NOT GAIN | INCREASE IMPEDANCE AND GAIN |
| SMALL (1230) | SMALL | YES | NO | YES |
| LARGE (1240) | SMALL | NO | YES | NO |
| LARGE (1250) | LARGE | NO | YES | NO |
| SMALL (1260) | LARGE | NO | NO | NO |

FIG. 12

POWER DISSIPATION REDUCTION IN WIRELESS TRANSCEIVERS

CROSS-REFERENCES TO RELATED APPLICATIONS

This application is a continuation of U.S. patent application Ser. No. 17/407,897, filed Aug. 20, 2021, currently pending, which is a continuation of U.S. patent application Ser. No. 16/714,629, filed Dec. 13, 2019, now U.S. Pat. No. 11,129,097, which is a continuation of U.S. patent application Ser. No. 15/824,841, filed Nov. 28, 2017, now U.S. Pat. No. 10,524,202, which is a continuation of U.S. patent application Ser. No. 15/080,421, filed Mar. 24, 2016, now U.S. Pat. No. 9,838,962, which is a continuation of U.S. patent application Ser. No. 11/318,646, filed Dec. 27, 2005, now U.S. Pat. No. 9,331,728, which is a continuation of U.S. patent application Ser. No. 10/784,613, filed Feb. 23, 2004, now U.S. Pat. No. 7,010,330, which claims the benefit of U.S. Provisional Application Nos. 60/451,229, filed Mar. 1, 2003 and 60/451,230, filed Mar. 1, 2003, the disclosures of which are hereby incorporated herein by reference in their entireties.

BACKGROUND

The present invention relates to power dissipation reduction techniques for electronic circuits, for example wireless transceiver integrated circuits.

Wireless networking is quickly becoming ubiquitous, as desktop, notebook, and handheld computers are connected to share Internet access and files. Wireless networking cards compatible with PCMCIA and compact flash form factors are popular for laptops and handhelds respectively, particularly as mobile users connect to the Internet on the road at coffee shops, hotels, and airports.

A downside of this connectivity is a corresponding drain on battery life, especially for these portable devices. The power consumed by a wireless transmitter and receiver reduces the usefulness of a device and sends a user on a hunt for an electrical outlet for recharging.

One reason why this power drain is high is that electronic circuits are typically designed to function properly under worst-case operating conditions. For a wireless transceiver, the worst case condition is when a desired signal reception strength is low, while other transceivers or nearby electronic equipment generate interfering signals and other spurious noise.

But a wireless transceiver does not always operate in these worst-case conditions. For example, a base station, router or access point may be nearby such that the received signal is strong. Also, there may be no interfering signals, or they may be relatively weak. In these situations, receiver circuit currents can be reduced below what is necessary for the worst case condition. If this is done, power dissipation is reduced, and battery life is increased.

Thus, what is needed are circuits and methods that can adapt to a better-than-worst-case condition and reduce circuit currents and therefore power dissipation accordingly.

SUMMARY

Accordingly, embodiments of the present invention provide methods and circuits for reducing power dissipation in wireless transceivers and other electronic circuits and systems. Embodiments of the present invention use bias current reduction, impedance scaling, gain, and other dynamic changes either separately or in combination to reduce power dissipation in response to better-than-worst case conditions. For example, bias currents are reduced in response to a need for reduced signal handling capability, impedances are scaled thus reducing required drive and other bias currents in response to a strong received signal, or gain is varied and impedances are scaled in response to a low received signal in the presence of no or weak interfering signals. Alternately, currents may start low and be increased in response to worse-than-best-case conditions, or they may start at a point in between and vary up or down. These variations may be made to electronic systems generally, and are particularly suited and discussed below in the context of a wireless transceiver that may be used in networking devices, cellular telephones, and other wireless systems.

An exemplary embodiment of the present invention provides a method of receiving a signal using an integrated circuit. The integrated circuit includes a signal path having a low-noise amplifier configured to receive the signal, a mixer having an input coupled to an output of the low-noise amplifier, and a low-pass filter having an input coupled to an output of the mixer. The method itself includes determining a first signal strength at a first node in the signal path in the integrated circuit and dynamically changing an impedance of a component in the signal path based on the first signal strength.

A further exemplary embodiment of the present invention provides a method of receiving a signal using an integrated circuit. The integrated circuit includes a signal path having a low-noise amplifier configured to receive the signal, a mixer having an input coupled to an output of the low-noise amplifier, and a low-pass filter having an input coupled to an output of the mixer. The method itself includes determining a first signal strength at a first node in the signal path in the integrated circuit and dynamically changing a bias current in the signal path based on the first signal strength.

Another exemplary embodiment of the present invention provides a method of receiving a signal using an integrated circuit. The integrated circuit includes a signal path having a first circuit and a second circuit having an input coupled to an output of the first circuit. The method itself includes determining a first signal strength at a first node in the signal path in the integrated circuit. The first node is before the first circuit in the signal path. The method further includes dynamically changing a gain of the first circuit based on the first signal strength and dynamically changing an impedance of a component in the second circuit based on the first signal strength.

Still a further exemplary embodiment of the present invention provides a wireless transceiver integrated circuit including a receiver having a signal path, the signal path including a low-noise amplifier, a mixer having an input coupled to an output of the low-noise amplifier, and a low-pass filter having an input coupled to an output of the mixer, as well as a first signal strength indicator circuit coupled to the signal path and configured to determine a first signal strength. An impedance in the signal path is configured to be dynamically adjusted in response to the first signal strength.

Yet a further exemplary embodiment of the present invention provides a wireless transceiver integrated circuit. This integrated circuit includes a receiver comprising a signal path, the signal path having a low-noise amplifier, a mixer having an input coupled to an output of the low-noise amplifier, and a low-pass filter having an input coupled to an output of the mixer, as well as a first signal strength indicator circuit coupled to the signal path, and configured to determine a first signal strength. A bias current in the signal path is configured to be dynamically adjusted in response to the first signal strength.

Another exemplary embodiment of the present invention provides a wireless transceiver integrated circuit. This circuit includes a receiver comprising a signal path, the signal path having a first circuit; and a second circuit having an input coupled to an output of the first circuit; as well as a first signal strength indicator circuit coupled to the signal path, and configured to determine a first signal strength. A gain of the first circuit is configured to be dynamically adjusted in response to the first signal strength, and an impedance in the second circuit is configured to be dynamically adjusted in response to the first signal strength.

A better understanding of the nature and advantages of the present invention may be gained with reference to the following detailed description and the accompanying drawings.

BRIEF DESCRIPTION OF THE DRAWINGS

FIGS. 10A-10C illustrate one of the possible power saving techniques that may be used when received desired and interferer signals are all at a high power level;

FIG. 12 is a summary illustrating four different input conditions and some of the appropriate power-saving changes that may be made in response to those conditions;

DESCRIPTION OF EXEMPLARY EMBODIMENTS

Figure 1:
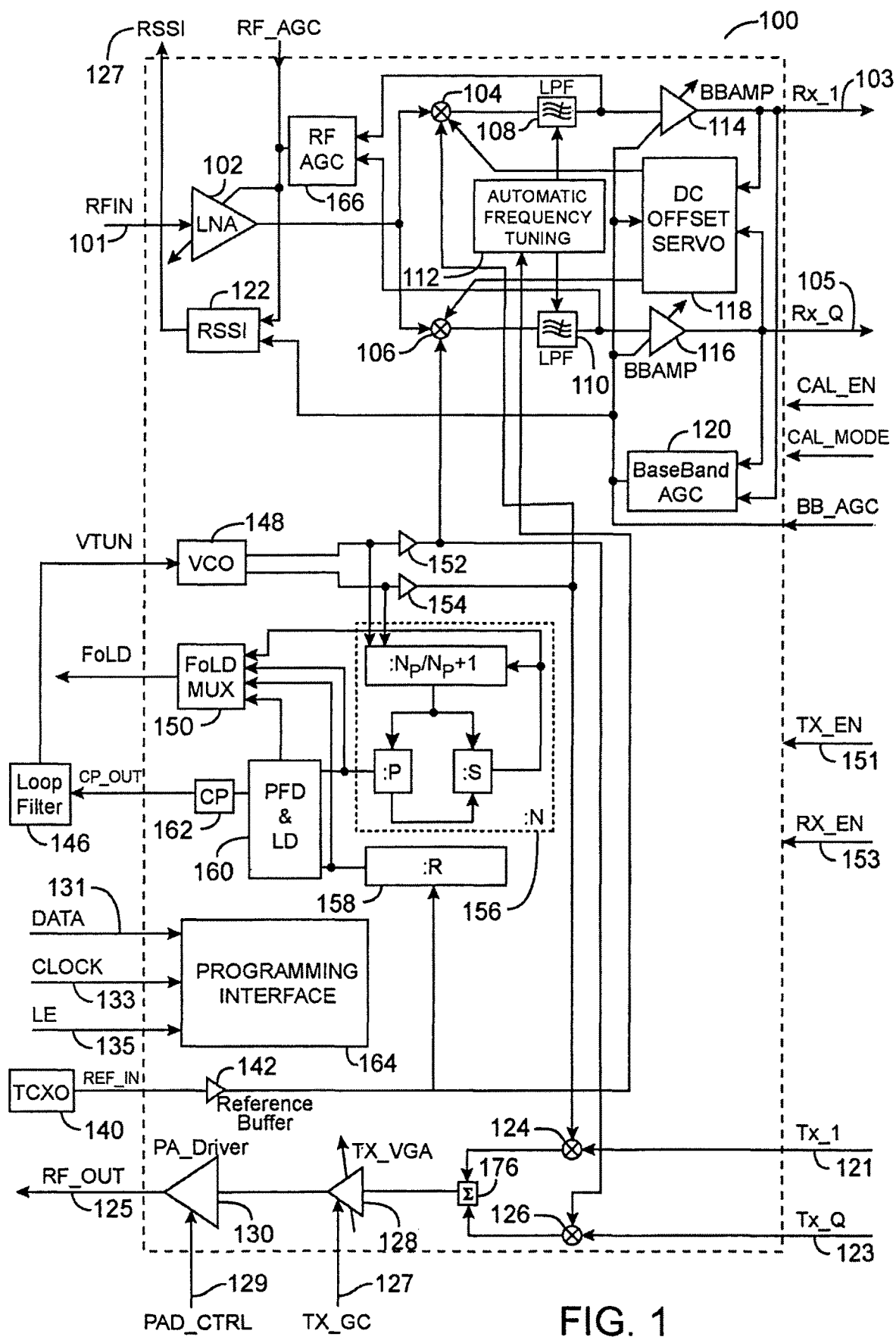
FIG. 1 is a block diagram of a wireless transceiver that may benefit by incorporation of embodiments of the present invention.

FIG. 1 is a block diagram of a wireless transceiver that may benefit by incorporation of embodiments of the present invention. This wireless transceiver may be designed to send and receive signals consistent with the IEEE 802.11a, 802.11b, 802.11g, or other signaling standard or combination of standards. This figure, as with all the included figures, is shown for illustrative purposes only and does not to limit either the possible embodiments of the present invention or the claims.

There are three main portions of this transceiver circuit, a receiver, transmitter, and synthesizer. This transceiver may be completely or partially integrated on a semiconductor chip, or it may be integrated onto multiple integrated circuits. In a specific embodiment, the circuitry bounded by dashed line 100 is integrated on a single chip coupled to one or more external components or circuits. The integrated circuit or circuits forming this wireless transceiver may incorporate various integrated circuit devices such as a bipolar, CMOS, or BiCMOS devices made using a silicon, silicon-germanium (SiGe), gallium arsenide or other III-V process, or other manufacturing process. Embodiments of the present invention may also be applicable to circuits manufactured using nanotechnology processing.

The receiver includes a signal path formed by low-noise amplifier 102, I and Q mixers 104 and 106, low pass filters 108 and 110, and baseband amplifiers 114 and 116. Other circuitry in the receiver includes received strength indicator 122, automatic gain control circuit 166, baseband gain control circuit 120, tuning circuit 112, and offset cancellation circuit 118.

The transmitter includes input up-converter mixers 124 and 126, summing node 176, which may be conceptual rather than an actual circuit, transmit variable gain amplifier 128, and power amplifier 130.

The synthesizer includes a voltage-controlled oscillator 148, which drives I and Q buffers 154 and 152, prescaler 156, reference clock buffer 142 and divider 158, phase-frequency detector 160, charge pump 162, and loop filter 146, which in a specific embodiment is formed by external components.

Signals are received on an antenna, not shown, and typically pass through an RF switch and bandpass filter before being received by the low-noise amplifier 102 on line 101. The low noise amplifier gains the received signal and provides it to quadrature mixers 104 and 106. I and Q mixers 104 and 106 down-convert the received signal to baseband by multiplying them with quadrature versions of the oscillator signal provided by buffers 152 and 154. This down conversion also produces a high frequency component at a frequency that is equal to the sum of the frequencies of the received signal and the VCO. This unwanted signal is filtered by low pass filters 108 and 110, which in turn drive baseband amplifiers 114 and 116. The outputs of baseband amplifiers 114 and 116 are typically converted to digital signals by analog-to-digital converters at the front end of a digital signal processing block.

In the transmit mode, I and Q versions of the signal to be transmitted are provided on lines 121 and 123 to up-convert mixers 124 and 126. These up-convert mixers multiply the I and Q portions of the transmit signal by quadrature versions of the VCO signal provided by buffers 152 and 154. The outputs of the up-convert mixers 124 and 126 are summed, and amplified by transmit VGA 128, which in turn drives power amplifier 130. The output of power amplifier 130 is typically filtered, and passes through the RF switch to the antenna for transmission.

A reference clock is received and buffered by the reference buffer 142. The VCO generates quadrature oscillatory signals that are divided by prescaler 156. The reference clock is typically generated by a crystal or other stable periodic clock source. The phase-frequency detector 116 compares the phase or frequency (depending on whether the synthesizer is tracking or acquiring the correct frequency) of the divided VCO signal and the reference clock, or a divided version of the reference clock, and generates an error signal, which drives the charge pump 162. The output signal of the charge pump 162 is filtered by the loop filter 146, which is commonly a lead-lag filter, and which provides a tuning or correction signal to the VCO 148.

Embodiments of the present invention may be used to reduce the power dissipation of one or more of these included circuits. For example, the power dissipation in the low-noise amplifier 102, down-convert mixers 104 and 106, low pass filters 108 and 110, or baseband amplifiers 114 and 116 may be optimized. Also, power dissipation in up-convert mixers 124 126, variable gain amplifier 128, and power amplifier 130 may also be optimized. Similarly, VCO 148 and prescaler 156 currents may be adjusted. Embodiments of the present invention may also be applied in other circuits which may be included in other integrated circuit receivers, transmitters, transceivers, or other electronic circuits or systems.

When a receiver is actively receiving a desired signal, each block in the signal path has at its input the desired signal as well as noise and possibly interfering signals. The desired signal is the useful, information-carrying portion of a received signal. The noise may be thermal, shot, or other noise generated on the integrated circuit, in addition to received noise generated by sources external to the chip. The noise at the input of a block may be referred to as the equivalent input noise. The interfering signal or signals, or interferers, may be generated by similar transceivers, or other electrical equipment, circuits, or systems.

Figure 2B:
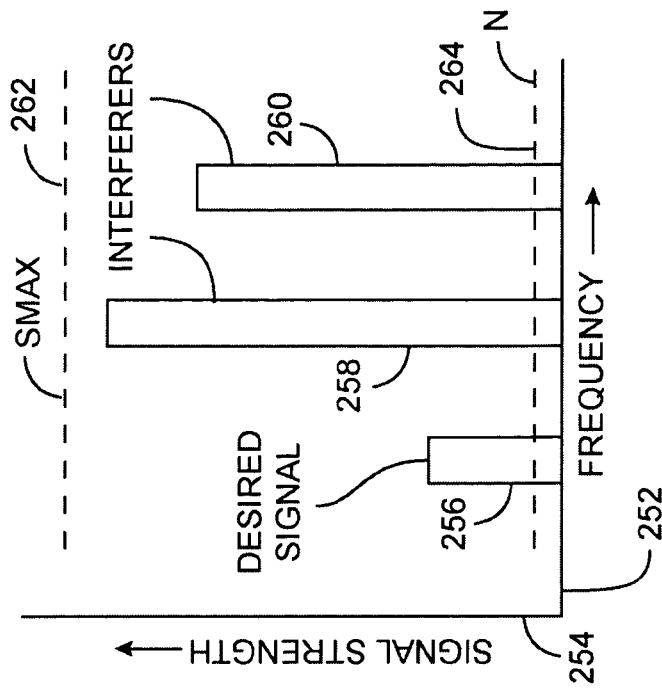
FIGS. 2A and 2B illustrate examples of desired and interfering signals and noise that may be received by a circuit in a wireless receiver.
Figure 2A:
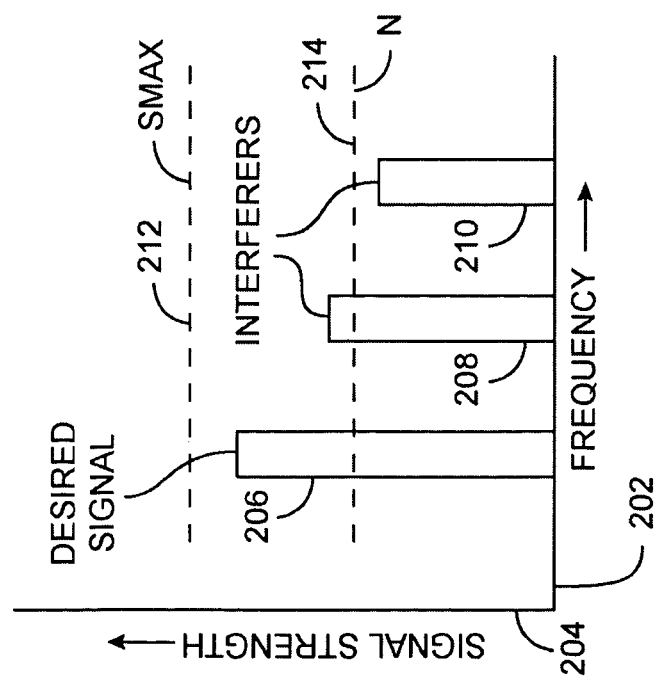

FIGS. 2A and 2B illustrate examples of desired signals, interferers, and noise that may be received by one of the various circuits in a wireless receiver. In each of these figures, the signal strength is plotted along a Y-axis 204 or 254 as a function of frequency along an X-axis 202 or 252. In the example of FIG. 2A, a received desired signal 206 is large in comparison to interfering signals 208 and 210. In these examples, two interfering signals are shown for illustrative purposes, though there may be no such signals, one such signal, or more than two such signals in the frequency range of interest. Also, while for these examples the interferers are shown as being at a higher frequency than the desired signal, there may be one or more interferers at higher or lower frequencies as the desired signal. In this specific example, the acceptable noise floor 214 is relatively high, while maximum signal handling capability Smax 212 (that is the maximum signal power that can be handled with an acceptably low distortion) needs only to be high enough to accommodate the desired signal. For this specific example, the circuit receiving this input spectrum only requires a relatively small dynamic range for proper operation, that is the range between Smax 212 and the noise floor 214 is relatively small.

Conversely, in the example shown in FIG. 2B, the desired signal 256 is relatively weak compared to the large interferers 258 and 260. In this example, the noise floor 264 should be relatively low so as to prevent an unacceptable level of error in the recovery the desired signal 256. The maximum signal handling capability Smax 262 should be relatively high to accommodate the large interferers in order to avoid the creation of intermodulation products as described below. Accordingly, in this specific example, the circuit receiving this input spectrum should have a large dynamic range, particularly in comparison to the example of FIG. 2A.

It should be noted that the noise level or noise floors shown in these and the other included figures is the noise density integrated over the bandwidth of interest. For simplicity and comparison, this level is shown as a horizontal line, and is not meant to imply noise density.

Often in wireless receivers, a circuit at different times will receive an input spectrum similar to those shown in FIGS. 2A and 2B. The input spectrum of FIG. 2B is generally considered the worst-case input signal, and typical design methodology involves designing a receiver for this condition, specifically the weakest desired signal accompanied by largest interference level. Circuit impedances and currents are set such that the noise floor 264 is sufficiently low for an acceptable bit-error rate, while bias currents are set sufficiently high for the required Smax 262.

Conversely, the input spectrum in FIG. 2A is that of the best-case input signal, specifically, a robust desired signal accompanied by no or low-level interferers. In this case, the noise floor 214 may be allowed to rise, while the maximum signal handling capability Smax 212 may be reduced. When this is done, the receiver circuit may save significant power. For example, the circuit's impedances may be increased, thus reducing required drive currents. Similarly, bias currents may be lowered, thus reducing the maximum signal in handling capability.

The minimum power dissipation for a circuit is proportional to the required maximum signal-to-noise ratio, which is the ratio between Smax 212 or 262 and N 214 and 264. Thus, a circuit receiving an input similar to the one shown in FIG. 2A can dissipate less power than one receiving the input as shown in FIG. 2B, while still achieving an acceptable bit-error rate.

Figure 3:
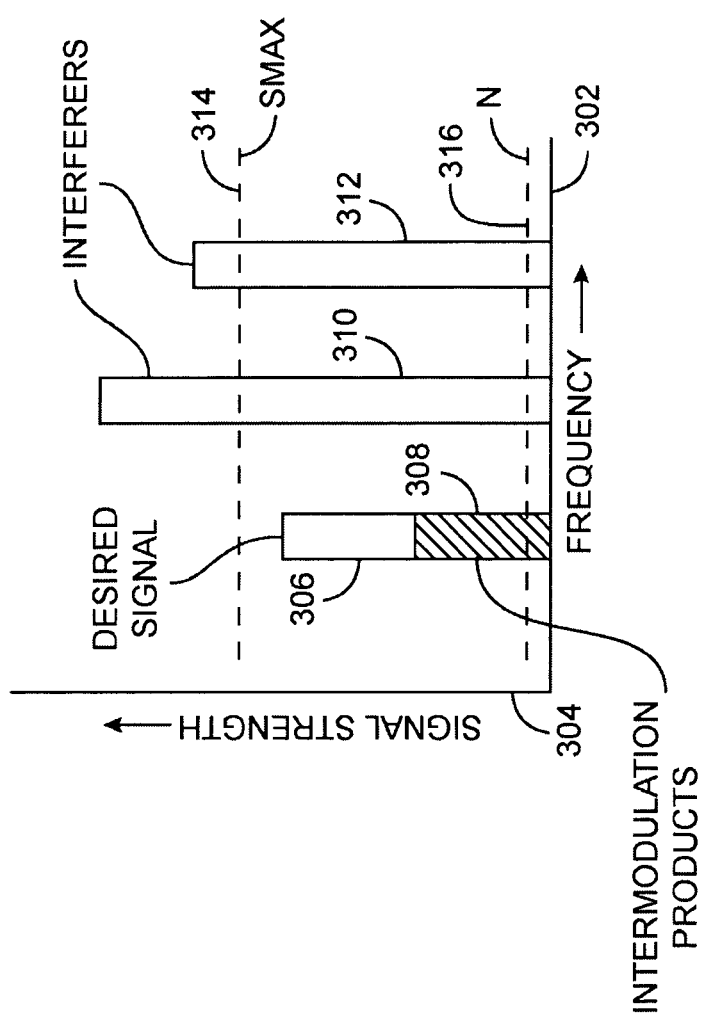
FIG. 3 illustrates what can occur as a maximum signal handling capability is reduced in the worst-case signal condition.

FIG. 3 illustrates what can occur when the maximum signal handling capability Smax 314 is reduced in the worst-case condition, that is when a weak desired signal 306 is accompanied by large interferers 310 and 312. Again, signal strength is plotted along a Y-axis 304 as a function of frequency along X-axis 302. In this specific example, Smax 314 is reduced below the peak levels of the interferers 310 and 312. Since Smax is low, the circuit cannot handle the interferers linearly. The resulting nonlinearities lead to a mixing of the interferers and the creation of intermodulation products 308 (for example, a third-order intermodulation distortion, IM3), one of which in this example occurs at the same frequency as the desired signal 306. As can be seen, if the intermodulation products 308 become excessive, the received signal bit error rate may become excessive, and the desired signal 306 may be lost. Accordingly, while Smax may be lowered even under some unfavorable conditions in order to reduce power, care should be taken to avoid corruption of the received desired signal.

Figure 4:
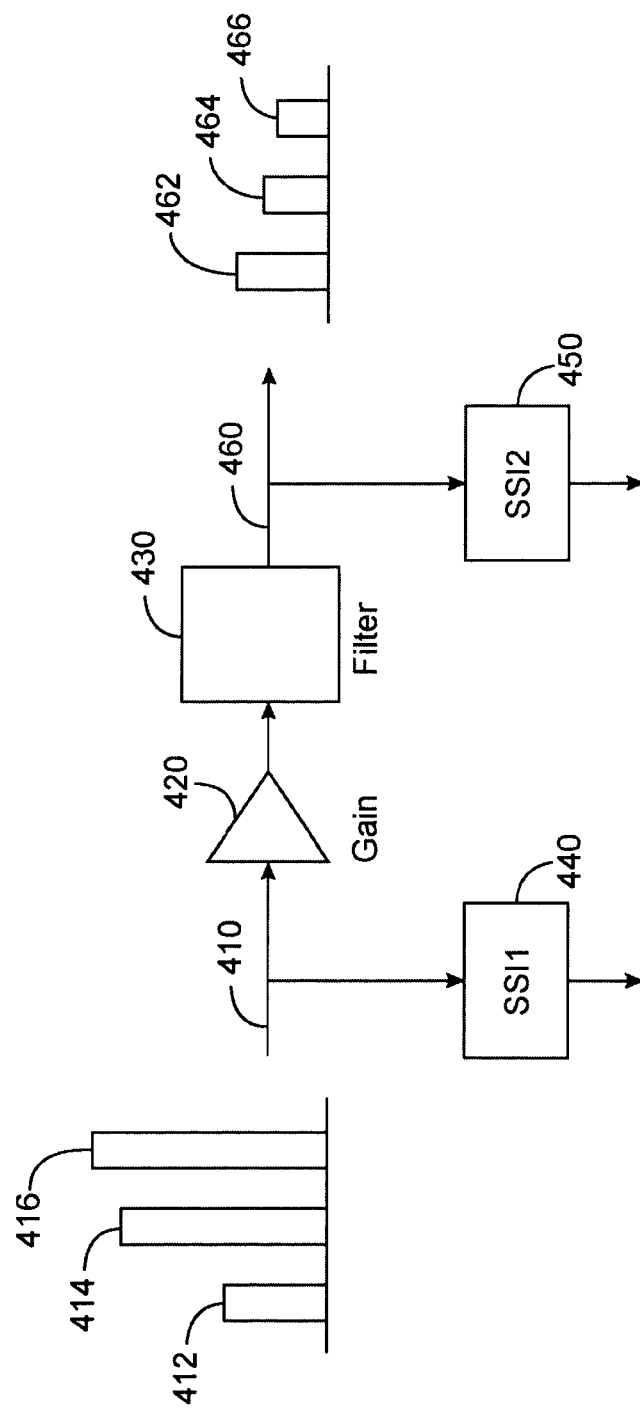
FIG. 4 illustrates a portion of a receiver consistent with an embodiment of the present invention.

FIG. 4 illustrates a portion of a receiver consistent with an embodiment of the present invention. Included is a filter 430. An optional gain element 420 is placed in front of the filter 430 in order to increase signal levels. Signal strength indicator circuits 440 and 450 are connected to input line 410 and output line 460. In this specific example, the input signal spectrum on line 410 is shown as desired signal 412 and interferers 414 and 416. The signal spectrum at the output line 460 is shown as desired signal 462 and interferers 464 and 466. The signal strength indicators 440 and 450 do not provide information as to the relative sizes of the desired and interfering signals. Rather, a cumulative signal level is provided at their outputs. For example, the first signal strength indicator 440 outputs a level corresponding to the sum of desired signal 412 and interfering signals 414 and 416, while the second signal strength indicator 450 provides a signal level corresponding to the sum of desired signal 462 and interfering signals 464 and 466. In this specific example, the gain of the gain and filter circuit combinations is shown as approximately one, while the interfering signals 414 and 416 signal levels are reduced.

A comparison of the signal levels provided by the signal strength indicators 440 and 450 indicates that much of the combined received signal on line 410 has been filtered. Accordingly, it may be deduced that large interfering signals present at the input are being filtered by the filter 430. From this information, as will be shown in greater detail below, the bias, impedance, and gain of the gain stage 420 and filter 430 combination may be optimized to reduce power dissipation.

There are several real world situations where the received signal is better than the worst-case condition such that power can be saved. For example, large interferers may be present only part of the time, that is, on a temporary or transient basis. The interfering equipment may be some distance from the transceiver, or it may be operating in the low power mode. Also, the desired signal may be very strong as compared to the noise and interferers, for example a hub, router, or access point may be nearby.

Some transceivers consistent with embodiments of the present invention are designed to work with more than one data transfer specification or standard. In this case, when a transceiver is operating in a mode having a lower data rate, the power saving techniques described here may be employed.

Figure 5:
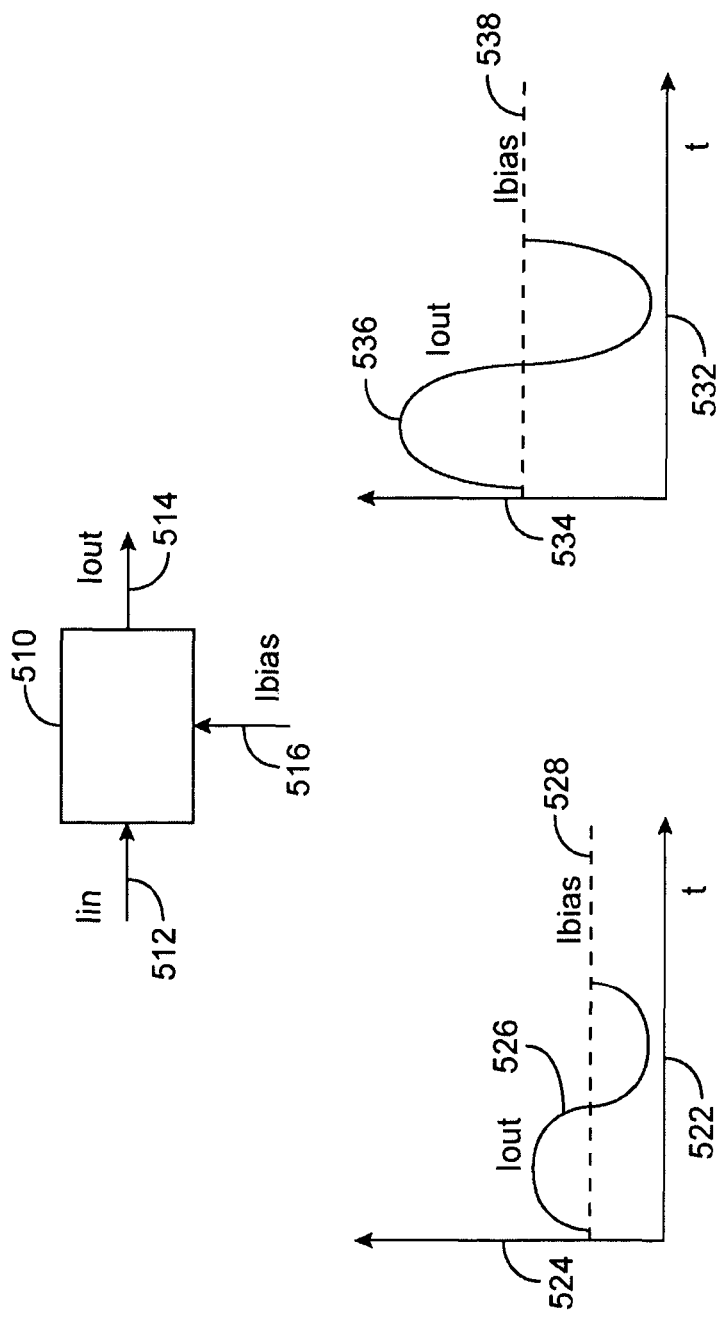
FIG. 5 illustrates the relationship between a required bias current and a given output signal for a representative circuit.

FIG. 5 illustrates the relationship between a required biased current 516 for a given output signal 514 for a representative circuit 510. If the output signal current level is relatively low, such as the output current shown as 526, the corresponding bias current 528 may be low. Conversely, if the output signal current level is larger as with the example 536, the corresponding bias current level 538 should also be high. Accordingly, if a bias current is initially set high to handle large a large input signal, for example a large interferer, this current may be reduced if the input signal is smaller.

There are many ways by which these bias currents can be reduced. For example, the current may be generated by placing a voltage across a resistor by applying a bias voltage to the base of a device whose emitter is connected to ground through a resistance. In this case, the resistor may be increased by opening switches across portions of the resistance, or lowering the bias voltage applied at the base. Several ways in which this may be done will be readily understood by one skilled in the art.

Figure 6:
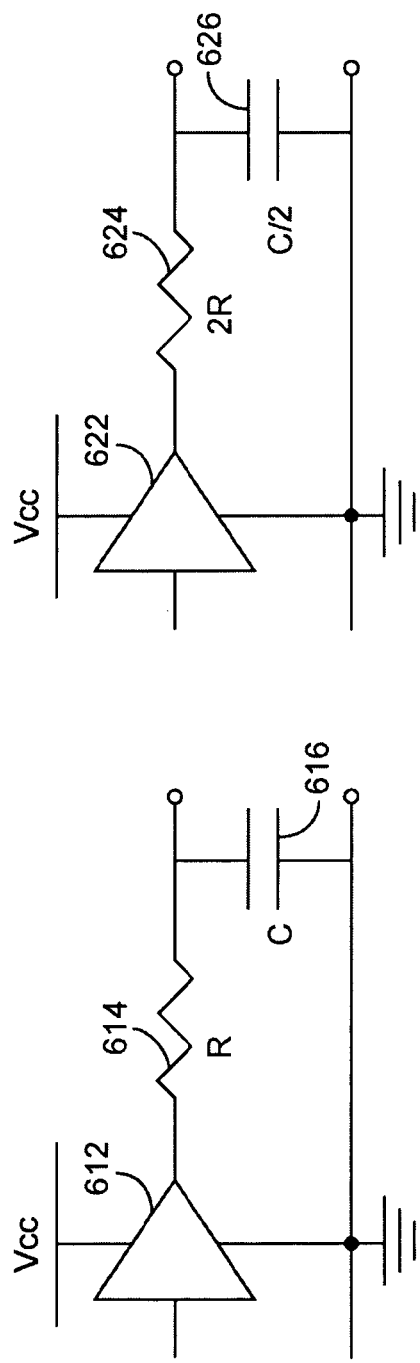
FIG. 6 is an example of how a circuit's impedances may be scaled to reduce drive currents, and depending on the circuit configuration used, to reduce associated bias currents as well.

FIG. 6 is an example of how a circuit's impedances may be scaled to reduce drive currents, and, depending on the circuit configuration used, associated bias currents as well. A driver 612 has a load R 614 and C 616. The frequency response of this circuit is the same as that seen by driver 622, which drives an impedance of 2R 624 and C/2 626. But the impedance of the load seen by driver 622 is double that seen by 612, thus the output current required by the driver 622 is reduced by one-half.

As an example, the output stage of each of these drivers may be a Class A emitter follower formed by an emitter follower connected to a current source. When the outputs are driven high, the emitter of driver 622 need supply only one-half the drive current as driver 612. In this way, an impedance can be scaled in order to decrease a circuit's required drive current.

Also, the discharge current for driver 622 is only one half that of driver 612 for a given negative-going slew rate. Thus, the current source of 622 may be reduced by the same factor of one-half as compared to driver 612. In this example, the bias current, that is the current in the pull-down current source can be reduced. Many other examples where drive currents and possibly bias currents may be reduced will be appreciated by one skilled in the art.

Figure 7:
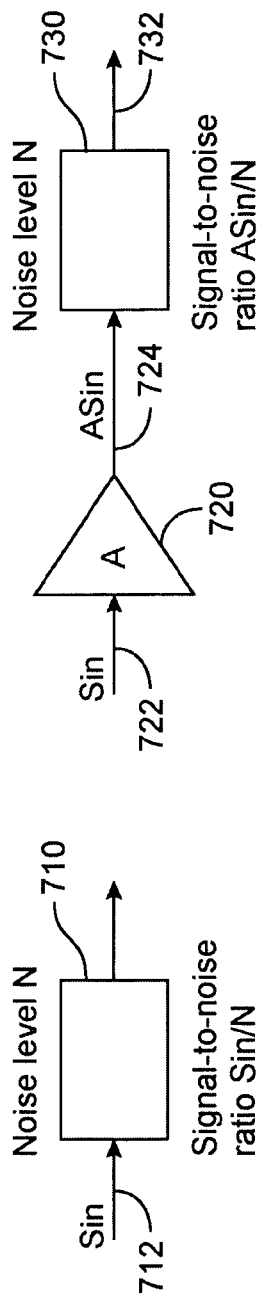
FIG. 7 illustrates how gain may be inserted in a signal path to improve a circuit's signal to noise ratio.

FIG. 7 illustrates another degree of freedom that made be employed to reduce current levels in a transceiver. Specifically, a gain element 720 may be inserted in front of a circuit block 730 in order to improve the combined circuit's signal-to-noise ratio by a factor equal to the gain of the inserted gain block. This is particularly useful when large interferers are absent and the desired received signal is moderate or low. Specifically, gain is added to the signal while impedances are increased, which raise the noise floor. In this way, a given signal-to-noise ratio may be maintained while the power is decreased.

The gain of such an element may be varied by increasing a current in a differential pair or increasing a load resistance using switches. Many other examples where the gain of this element may be varied will be appreciated by one skilled in the art.

These variables, or degrees of freedom, specifically reducing bias currents, increasing impedances, and increasing gain may be used as in the following examples.

Figure 8A:
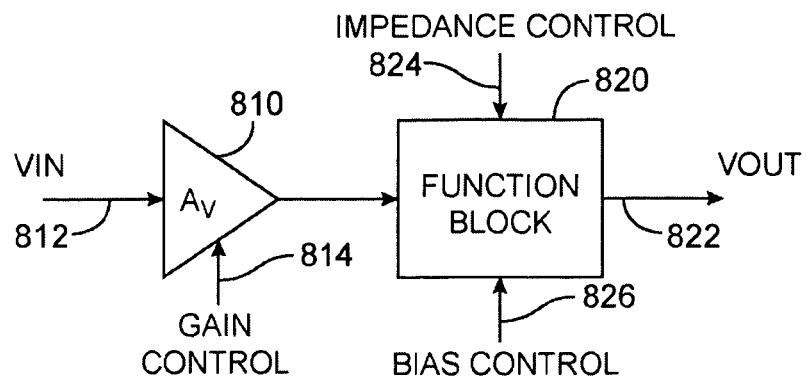
FIGS. 8A-8D illustrate some of the possible power saving techniques that may be used when received desired and interferer signals are all at a low power level.

FIG. 8A is a block diagram of a functional block 820 and optional gain element 810 in accordance with an embodiment of the present invention. Functional block 820, like the functional blocks in the following diagrams, may be a filter, mixer, amplifier, or other circuit or circuits in a wireless transceiver or other electronic circuits or system. An input signal is received on line 812 by the optional gain element 814. When the optional gain block 810 is not used, the input signal may be received directly by the function block 820. The gain of the optional gain element 812 is controlled by a gain control signal on line 814. The functional block receives an output signal from the optional gain element 810 and provides an output VOUT on line 822. The lines in this and the other included figures may be one or more lines, depending on whether single-ended, differential, or other type of signaling is employed.

One or more impedances are under control of signals on impedance control lines 824. Similarly, one or more bias currents in the function block are under control of one or more signals on bias control lines 826. These various control lines may be logic signals, analog signals, voltage or currents lines, or other signal or bias lines. In other embodiments of the present invention, the gain control element 810 may be included in the function block 820. Also, various embodiments may not incorporate either or both the impedance control and bias control.

Figure 8C:
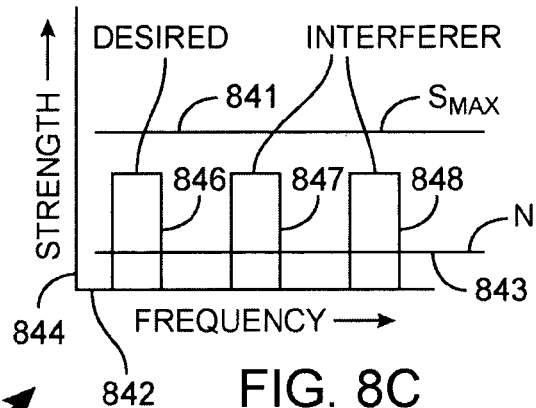
Figure 8B:
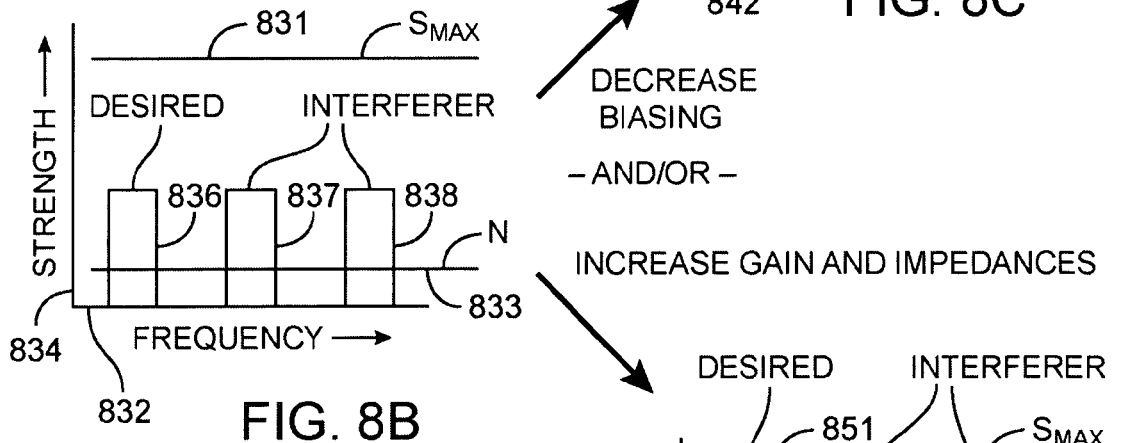

FIG. 8B is an example input that may be present on line VIN 812. In this example, a desired signal 836 is relatively weak, as are interfering signals 837 and 838. The initial bias and circuit configuration is such that the noise floor 833 and maximum signal handling capability Smax 831 are adjusted for worst case conditions. The circuit of FIG. 8A, as with all the circuits described here, receives noise at its input which may be referred to as input equivalent noise or input referred noise. Additionally, the circuit of FIG. 8A generates noise which is added to the input referred noise. Depending on the gain characteristics of the circuitry, the output noise at various frequencies may be greater than, equal to, or less than the input referred noise. For simplicity, the noise floor and maximum signal handling capability Smax, in this and the other figures, are shown as straight lines, though the noise and Smax are typically curved as a function of frequency.

That the input spectrum is as shown in FIG. 8B can be determined, for example, by low signal strength indications on line VIN 812 and VOUT 822. That is, a low level signal strength indication on line VIN 812 indicates that no portion of the input signal is particularly large.

For this exemplary input, there are at least two methods by which the power dissipation for this circuitry may be reduced. Depending on the exact circuits and structures used, one of these methods may be preferred.

In FIG. 8C, the bias current is decreased, thereby lowering the maximum signal handling capability 841 as compared to 831, closer to the desired and interfering signal levels. Again, the bias currents in the function block 820 may be reduced by switching impedances that appear across a voltage thereby changing a resulting bias current, by reducing a voltage at the gate of a MOS or base of a bipolar transistor, or by other methods.

Figure 8D:
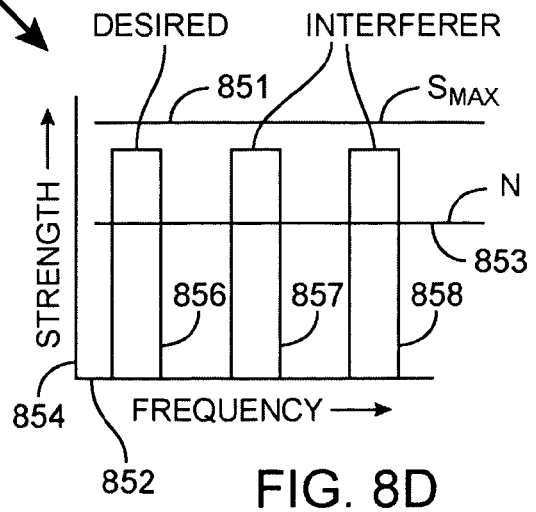

In FIG. 8D, a second method of reducing power dissipation in the function block 820 is employed. Specifically, Smax 851 is held constant as compared Smax 831. The desired and interfering signals are amplified such that they are closer to the available signaling handling capability 851. Also, the noise floor 853 is raised as compared to noise floor 833 in FIG. 8B. Specifically, the noise contributed by the function block 820 is increased, such that the noise at its output is increased to noise floor 853. This is done by increasing one or more impedance in function block 810, such that drive currents inside that block are reduced. Depending on the exact configuration, this may also allow some biasing currents to be reduced, while maintaining the maximum signal handling capability 851 at a sufficient level. Alternately, these two methods of reducing power dissipation in function block 820 may be done in combination.

The included examples are explained for the exemplary situation where biasing and other parameters are set for worst-case conditions, and then changed to save power when it is discovered that the conditions are better-than-worst case. Alternately, the bias currents and other parameters may be set for maximum power savings, or an intermediate point, and the power can be adjusted from there.

Figure 9A:
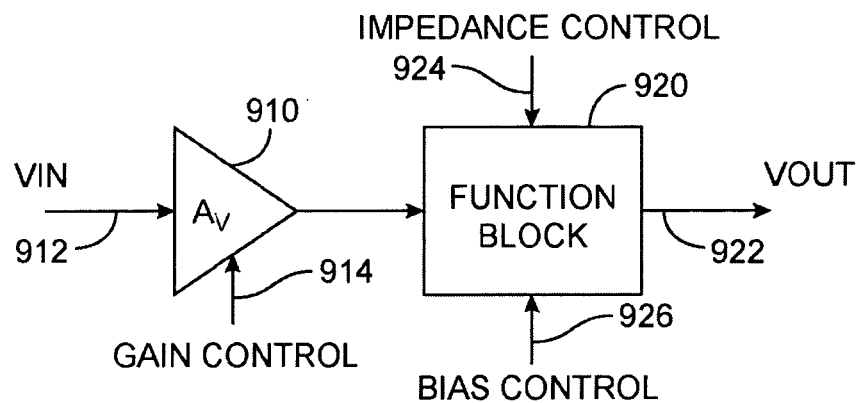
FIGS. 9A-9C illustrate one of the possible power saving techniques that may be used when a received desired signal is strong while all interfering signals are at a low power level.

FIG. 9A illustrates a block diagram including an optional gain element 910 and function block 920. Again, an input signal is received on line 912 by optional gain element 910 which in turn drives function block 920. The function block provides an output VOUT on line 922, and receives impedance and bias control signals on lines 924 and 926.

Figure 9B:
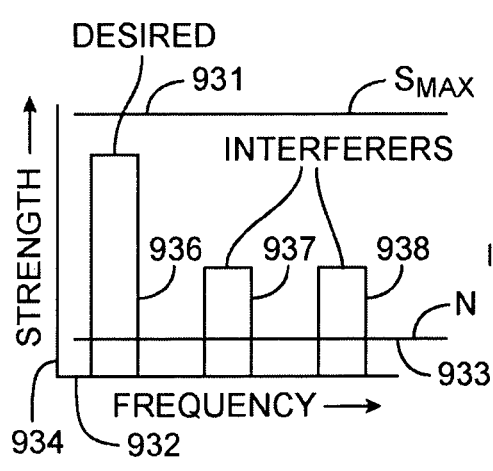

FIG. 9B shows the spectrum for what may be considered a best-case received signal. Specifically, the desired signal 936 is strong, while the interfering signals 937 and 938 are relatively weak. This may be determined, for example, by detecting a large signal level at the input line VIN 812 and a large signal level after a filter, since these readings would indicate that a large signal is received, but that it is at the desired signal frequency.

Figure 9C:
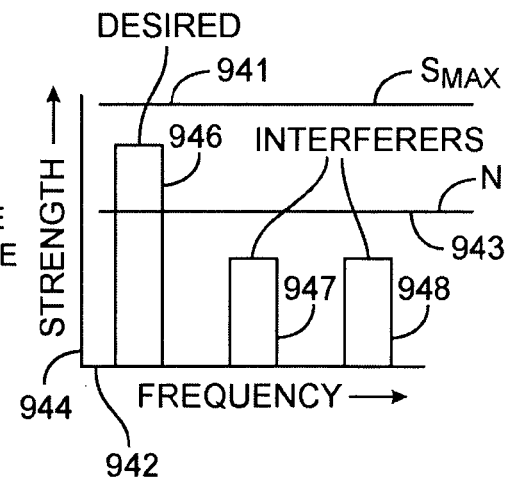

The maximum signaling capability 931 and noise floor 933 are shown as being set for the worst case conditions. In this case, the noise floor 933 is lower than the maximum allowed for proper signal reception. Accordingly, one or more impedance in the function block 920 may be increased, such that the noise floor 943 rises as shown in FIG. 9C. In this way one or more the driving currents in the function block 920 may be reduced. Similarly, since the drive current is reduced, one or more bias current may also be reduced, depending on the exact circuit configuration.

FIG. 10A illustrates a block diagram showing an optional gain element 1010 driving a function block 1020. An input signal is received by the gain element 1010 on line 1012, and an output is provided by function block 1020 on line VOUT 1022. One or more gain control signals present on lines 1014 control the gain of gain control element 1010, while one or more impedance and bias control signals are received by the function block 1020 on line to 1024 and 1026.

FIG. 10B illustrates a received signal that may be received on line VIN 1012. In this example, the desired signal 1036 and interferers 1037 and 1038 are each relatively large. This may be determined, for example, by detecting a large signal level at the input line VIN 812 and a smaller signal level after a filter, since these readings would indicate that a large signal is received, but that interferers are being reduced.

As before, in this example, the noise floor 1033 and maximum signal handling capability 1031 are initially set for the worst case conditions. Since the desired signal is relatively large in this case, the noise floor may be allowed to rise, a shown by noise floor 1043 in FIG. 10C. Since the desired signal 1046 and interferers 1047 are large, the maximum signal handling capability Smax 1041 remains constant. Again, the noise floor is increased by increasing impedances in the function block 1020. This reduces the required drive current, and may also allow for a reduction in bias currents.

Figure 11A:
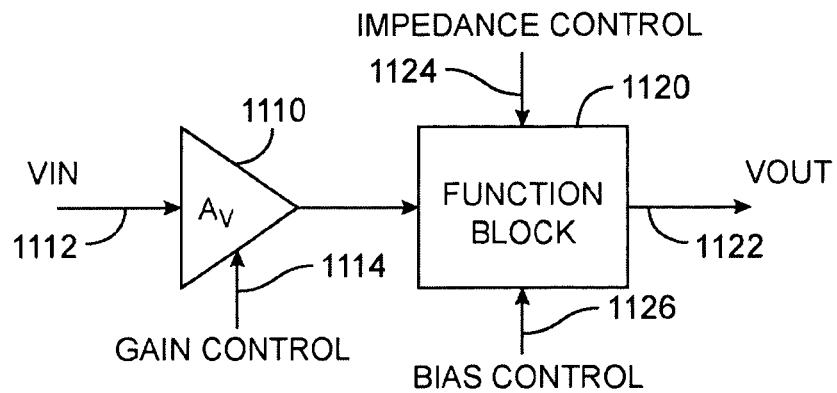
FIGS. 11A-11D illustrate one of the possible power saving techniques that may be used when a received desired signal is weak while one or more interfering signals are strong.

FIG. 11A illustrates a block diagram including an optional gain element 1110 and function block 1120 in accordance with an embodiment of the present convention. An input signal is received on line 1112 by the optional gain control element 1110, while an output signal is provided by the function block 1120 on line VOUT 1122. Gain, impedance, and bias control signals are received on lines 1114, 1124, and 1126.

Figure 11B:
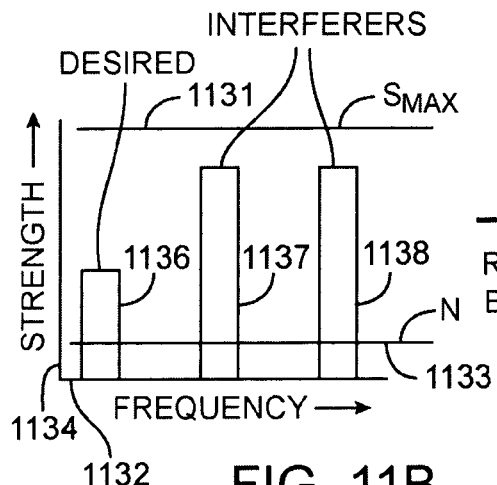

FIG. 11B is an exemplary input signal that may be received by the gain control element 1110 on line VIN 1112. In this specific example, the desired signal 1136 is relatively low or weak while the interfering signals 1137 and 1138 are large. This may be determined, for example, by detecting a large signal level at the input line VIN 812 and a much smaller signal level after a filter, since these readings would indicate that a large signal is received and that large interferers are being reduced such that the resulting signal, the desired signal, is relatively weak.

Again, the maximum signal handling capability 1131 and noise floor 1133 are initially set for worst case conditions. If the desired signal is sufficiently low, while the interferers are sufficiently high, power savings may not be achievable over the worst case settings, since this is in fact the worst case condition. But, if the desired signal is somewhat larger than the worst case condition, then power may be saved in at least two different ways.

Figure 11C:
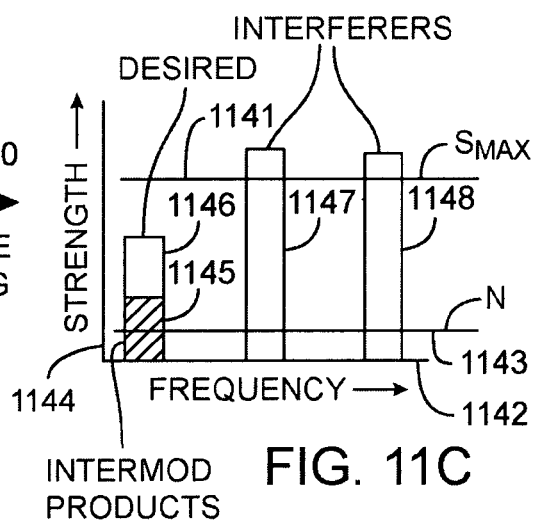

For example, FIG. 11C shows the maximum signal handling capability 1141 being lowered. In this case, the interfering signals 1147 in 1148 began to clip and distort, thereby creating intermodulation products 1145, which distort the desired signal 1146. So long as care is taken to not corrupt the desired signal 1146 beyond an acceptable limit, typically measured by a bit-error rate, power may be reduced in this way.

Figure 11D:
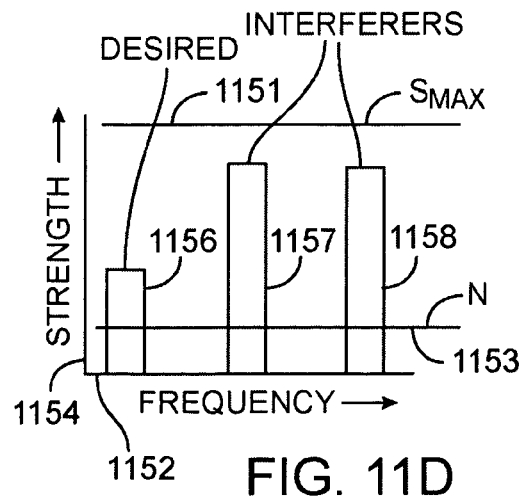

Similarly, in FIG. 11D, the noise floor 1153 is raised somewhat, thereby saving power. Again, this may be done so long as the noise floor is not sufficiently high that the system bit-error rate becomes unacceptable.

FIG. 12 is a summary of the above four examples. The received signal strengths are shown in column 1210, while appropriate power saving responses are listed in column

1220. Specifically, in row 1230, the desired signal and interferer signal strengths are both weak or small. In this case, proper responses include decreasing Smax, or increasing one or more circuit impedances while increasing the circuit gain. Depending on the exact circuit configuration, one of these options may be preferred over the other. Alternately, they may be done in combination, or done in combination with other power saving techniques. Also, in some specific embodiments, when both desired signal and interferer signal strengths are small, the gain may need to be increased while the impedance is maintained or not increased in order to keep the noise floor low.

In row 1240, the desired signal strength is strong or large, while the interfering signals are small. In this case, an appropriate response is to increase one or more of the circuit impedances. Again, depending on the exact circuit in question, one or more of the bias currents may also be reduced.

In row 1250, both the desired signals and interfering signal strengths are large. Again, in this case an appropriate response is to increase one or more of the circuit impedances.

In row 1260, the received desired signal strength is weak or small, while the interfering signals are large. Since this is the worst case situation for which the circuit is designed, substantial power savings are difficult to achieve. However, again, if the received signal is above a minimum level necessary for proper operation, some distortion of the interferers or raising of the noise floor may be acceptable.

It should be noted that not all possible signal conditions are listed here. For example, either the signal or interferer may be of a relatively medium strength, or the interferer may be absent. Also, these terms are for exemplary purposes and are not meant to convey specific signal conditions, but rather are only qualitative. The proper response to a specific condition depends on the embodiment of the present invention, the particular circuit topology, the requirements of the signaling standard used, as well as other constraints.

Figure 13:
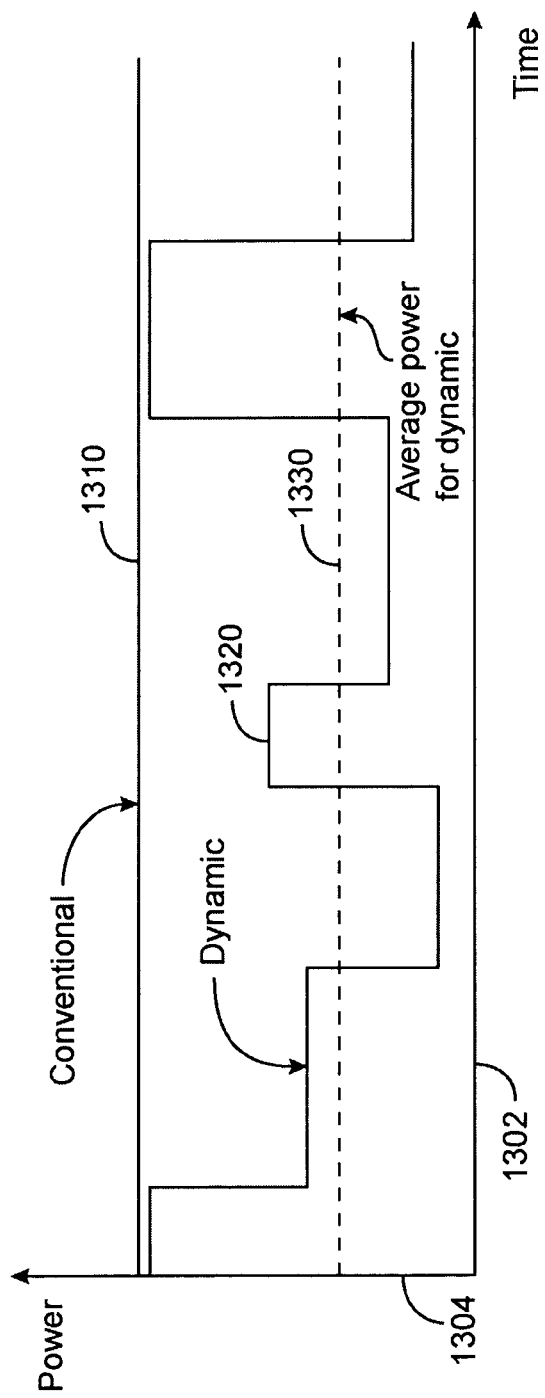
FIG. 13 shows how power may be saved as a function of time by employing one or more of the power saving methods consistent with embodiments of the present invention.

FIG. 13 is an example shown how power may be saved as a function of time by employing one or more of these methods consistent with embodiments of the present invention. Power is plotted along a Y-axis 1304 as a function of time along X-axis 1302. Conventional worst case design would fix power dissipation at line 1310. As can be seen, dynamic power dissipation 1320 under the control of variable gains, impedances, biasing, or combination thereof, allows for a lower average power 1330 as compared to the power dissipated 1310 by the conventional design.

Figure 14:
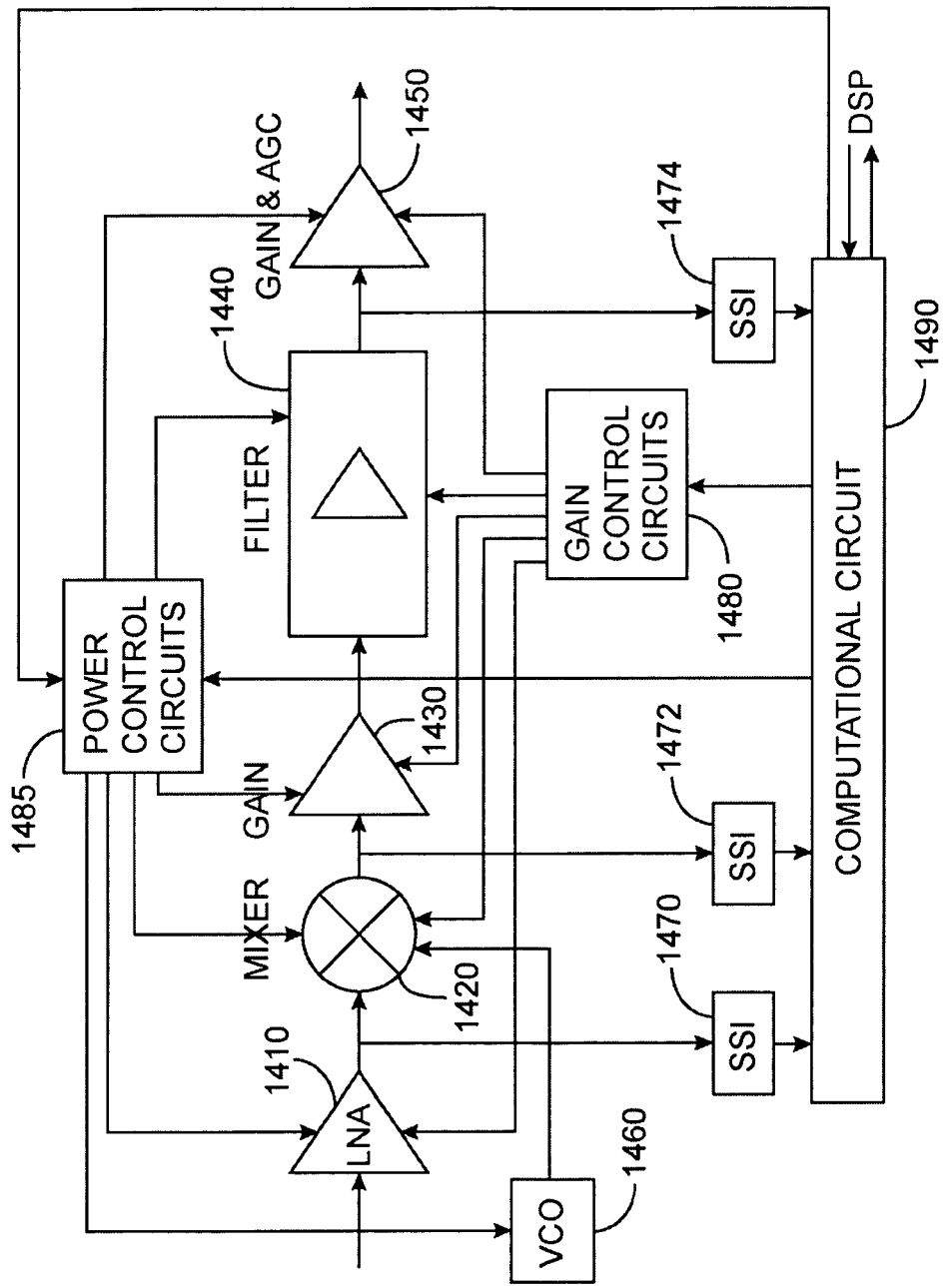
FIG. 14 is a block diagram of a portion of a receiver consistent with an embodiment of the present invention.

FIG. 14 is a block diagram of a portion of a receiver consistent with an embodiment of the present invention. Included are low-noise amplifier 1410, mixer 1420, gain stage 1430, filter 1440, AGC amplifier 1450, and VCO 1460. Signal strength detection is done at the output of the low-noise amplifier by signal strength indicator 1470, at the output of the mixer by signal strength indicator 1472, and at the output of the filter by signal strength indicator 1474. The outputs of the signal strength indicator circuits are received by the computational circuit 1470, which in turn controls gain and power control circuits 1480 and 1485. Power and gain control circuits 1480 and 1485 control the gain, biasing, and impedance levels of the circuits in the receiver signal path. Also, the gain and power control circuits may control the same parameters in the VCO 1460. This figure is greatly simplified for purposes of explanation. For example, the quadrature nature of the mixers and following circuits are not shown. Also, power-down and start-up circuits are not included.

The current level in the low-noise amplifier determines a multitude of parameters including voltage gain, linearity, input impedance matching, and noise figure. When conditions are better than worst-case, some of these parameters may be relaxed while maintaining an acceptable bit-error rate, thus saving power.

The bias current in the mixers effect that block's noise figure and linearity. Care is taken in reducing power in this block so as not to increase nonlinearities, particularly the third-order nonlinearity as measured by 1133, the third-order intercept point, beyond an acceptable limit.

A key parameter of the VCO is phase noise, an increase in which increases the sidebands on either side of the oscillation signal. During transmission, the phase noise should be kept low to avoid interference with adjacent channels and for preserving modulation information.

During reception however, if the conditions are better than worst case, the phase noise requirement for the VCO is relaxed, and power can be saved consistent with embodiments of the present invention. The achievable phase noise power spectral density is approximately inversely proportional to the bias current used. Thus, when low phase noise is not required during reception, bias current in the VCO can be reduced.

Most of the power savings in a transceiver in accordance with embodiments of the present invention is achieved in the receiver portion. Additional power may be saved in the transmitter section.

Figure 15:
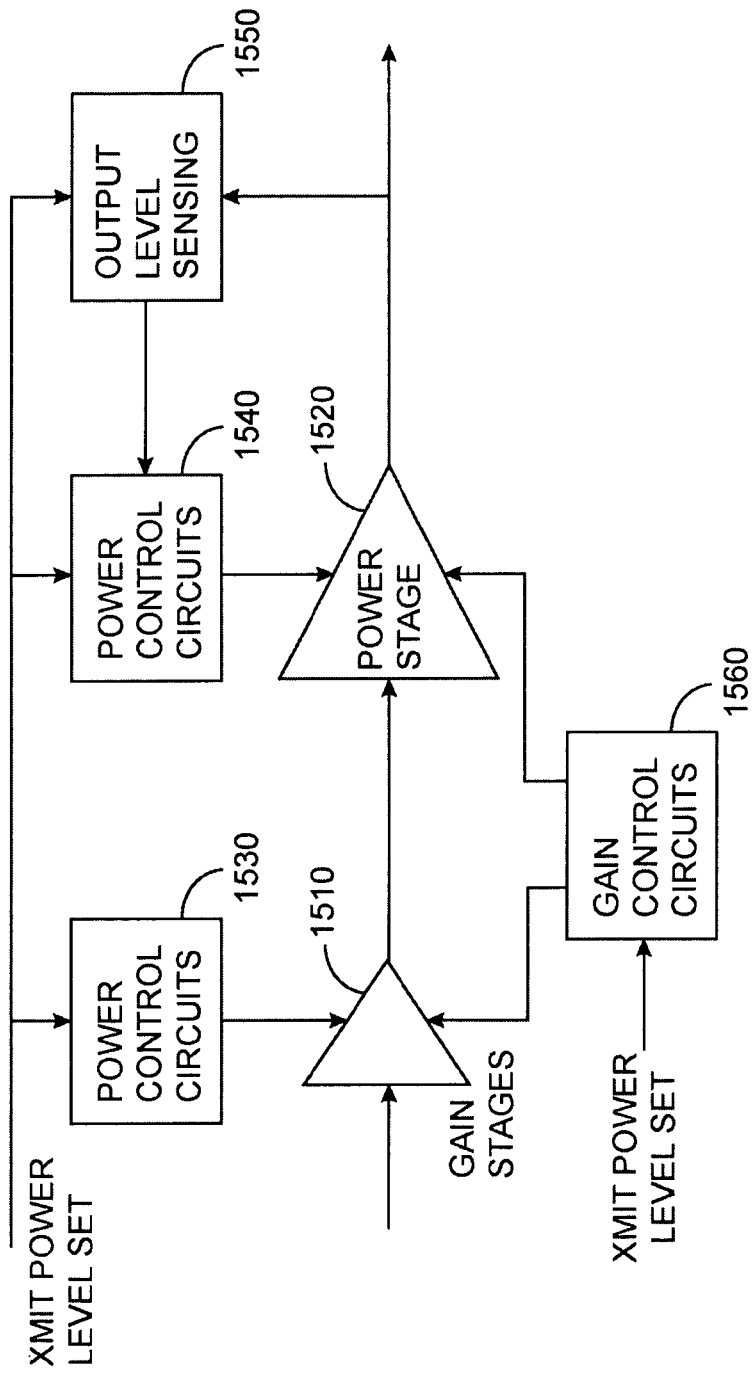
FIG. 15 is a block diagram of a portion of a transmitter consistent with an embodiment of the present invention.

FIG. 15 is a block diagram of a transmitter portion consistent with an embodiment of the present invention. Included is a signal path formed by gain stage 1510 and power amplifier 1520. The output power level is sensed by output level sensing circuit 1550, which in turn adjusts the biasing of the power amplifier 1520 through the power control circuit 1540. Additionally, a transmitter level control signal is received by power control circuits 1530 and 1540, which in turn control the biasing of gain stage 1510 and power amplifier 1520. Gain control circuit 1560 also adjusts the gain of gain stage 1510 and power amplifier 1520. Additional circuitry that varies impedances in each of these circuits may also be included.

Since the gain, impedance and biasing of these blocks are being dynamically varied, care must be taken to not negatively affect the signal being processed. For example, specific embodiments of the present invention perform some or all of these variations during preamble. Also, as changes occur, the circuits in some embodiments are limited such that they may only adapt to an improvement in conditions after frames are completed. If conditions worsen, the circuits may be allowed to change in order to save the data. Alternately, a system may be manually calibrated, for example at set up, and when the network configuration is changed.

The above description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A system for power dissipation reduction in a wireless receiver of a battery powered portable wireless device, and a corresponding reduction in a drain on battery life of the battery powered portable wireless device, the system comprising:
- the wireless receiver configured to receive a wireless signal having a desired signal and an interferer signal;
- the wireless receiver comprising a plurality of circuits, wherein the plurality of circuits comprise a receiver signal path and at least a circuit configured to determine a signal level of the interferer signal and a signal level of the desired signal; and
- wherein when the desired signal level is greater than the interferer signal level, and both the desired and interferer signal levels are greater than the a noise floor, an impedance affecting the receiver signal path is dynamically increased until the noise floor is greater than the interferer signal level but still less than the desired signal level, whereby one or more drive currents are reduced, thereby reducing power consumption.

2. The system of claim 1, wherein the reduction of power consumption increases a time interval between required recharging of the battery.

3. A system for power dissipation reduction in a wireless receiver of a battery powered portable wireless device, and a corresponding reduction in a drain on battery life of the battery powered portable wireless device, the system comprising:
- the wireless receiver configured to receive a wireless signal having a desired signal and an interferer signal;
- the wireless receiver comprising a plurality of circuits, wherein the plurality of circuits comprise a receiver signal path and at least a circuit configured to determine a signal level of the interferer signal and a signal level of the desired signal; and
- wherein when the desired signal level and the interferer signal level are both large, an impedance affecting the receiver signal path is dynamically increased causing the a noise floor to be increased, thereby reducing power consumption.

4. The system of claim 3, wherein dynamically adjusting an impedance is done consistently with a maximum signal handling level.

5. The system of claim 3, wherein the reduction of power consumption increases a time interval between required recharging of the battery.

6. A system for power dissipation reduction in a wireless receiver of a battery powered portable wireless device, and a corresponding reduction in a drain on battery life of the battery powered portable wireless device, the system comprising:
- the wireless receiver configured to receive a wireless signal having a desired signal and an interferer signal;
- wherein the wireless receiver comprises a plurality of circuits, wherein the plurality of circuits comprise a receiver signal path and at least a circuit configured to determine a signal level of the interferer signal and a signal level of the desired signal;
- wherein a worst case condition exists when the signal level of the desired signal is low in presence of an interferer signal; and
- wherein when the desired signal level is smaller than the interferer signal level but larger than the worst case condition, a bias affecting the receiver signal path is dynamically reduced causing the maximum signal handling level to be lowered, thereby reducing power consumption.

7. The system of claim 6, wherein when the bias affecting the receiver signal path is dynamically reduced, the maximum signal handling level is caused to be lowered to below the interferer signal level, consistent with a noise floor.

8. The system of claim 6, wherein the reduction of power consumption increases a time interval between required recharging of the battery.

9. The system of claim 6, wherein the bias affecting the receiver signal path being dynamically reduced is caused at least in part by dynamically varying an impedance.

10. A system for power dissipation reduction in a wireless receiver of a battery powered portable wireless device, and a corresponding reduction in a drain on battery life of the battery powered portable wireless device, the system comprising:
- the wireless receiver configured to receive a wireless signal having a desired signal and an interferer signal;
- the wireless receiver comprising a plurality of circuits, wherein the plurality of circuits comprise a receiver signal path and at least a circuit configured to determine a signal level of the interferer signal and a signal level of the desired signal;
- wherein a worst case condition exists when the signal level of the desired signal is low in presence of an interferer signal; and
- wherein when the desired signal level is less than the interferer signal level but greater than the worst case condition and the desired signal levels is greater than a noise floor, an impedance affecting the receiver signal path is dynamically increased, raising the noise floor and causing one or more drive currents to be reduced, thereby reducing power consumption.

11. The system of claim 10, wherein the reduction of power consumption increases a time interval between required recharging of the battery.

* * * * *

UNITED STATES PATENT AND TRADEMARK OFFICE
CERTIFICATE OF CORRECTION

| | |
|---|---|
| PATENT NO. | : 11,638,210 B1 |
| APPLICATION NO. | : 18/086603 |
| DATED | : April 25, 2023 |
| INVENTOR(S) | : Yannis Tsividis |

It is certified that error appears in the above-identified patent and that said Letters Patent is hereby corrected as shown below:

In the Claims

In Claim 1, Column 13, Line 13, reading: "greater than the a noise floor" should read: --greater than a noise floor--

In Claim 3, Column 13, Lines 36-37, reading: "increased causing the a noise floor" should read: --increased causing a noise floor--

In Claim 6, Column 14, Line 12, reading: "causing the maximum signal" should read: --causing a maximum signal--

In Claim 10, Column 14, Line 42, reading: "desired signal levels is greater than" should read: --desired signal level is greater than--

Signed and Sealed this
Thirtieth Day of May, 2023

Katherine Kelly Vidal
*Director of the United States Patent and Trademark Office*